(12) United States Patent
Lin

(10) Patent No.: US 10,529,203 B2
(45) Date of Patent: Jan. 7, 2020

(54) REGIONAL SURVEILLANCE AND ALARMING SYSTEM AND METHOD

(71) Applicant: HANGZHOU HIKVISION DIGITAL TECHNOLOGY CO., LTD., Hangzhou (CN)

(72) Inventor: Yanguo Lin, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/087,579

(22) PCT Filed: Oct. 27, 2016

(86) PCT No.: PCT/CN2016/103577
§ 371 (c)(1),
(2) Date: Sep. 21, 2018

(87) PCT Pub. No.: WO2017/161880
PCT Pub. Date: Sep. 28, 2017

(65) Prior Publication Data
US 2019/0114885 A1 Apr. 18, 2019

(30) Foreign Application Priority Data
Mar. 22, 2016 (CN) .......................... 2016 1 0165835

(51) Int. Cl.
G06K 9/00 (2006.01)
G08B 13/196 (2006.01)
G08B 25/00 (2006.01)
G08B 3/10 (2006.01)
G08B 5/36 (2006.01)
(Continued)

(52) U.S. Cl.
CPC ... G08B 13/19645 (2013.01); G06K 9/00771 (2013.01); G08B 3/10 (2013.01);
(Continued)

(58) Field of Classification Search
CPC ............ G08B 13/19645; G08B 25/001; G08B 13/19656; G08B 13/19608; G08B 5/36; G08B 25/14; G08B 13/19695; G08B 13/19697; G08B 25/08; G08B 3/10; G08B 25/00; G06K 9/00771
See application file for complete search history.

(56) References Cited

U.S. PATENT DOCUMENTS 6,678,413 B1 * 1/2004 Liang .................... A61B 5/1113
382/181
7,117,504 B2 * 10/2006 Smith ...................... G06F 8/20
719/328
(Continued)

FOREIGN PATENT DOCUMENTS

CN 2886706 Y 4/2007
CN 102142183 A 8/2011
(Continued)

OTHER PUBLICATIONS

Supplementary European Search Report of European Application No. 16 89 5226.

*Primary Examiner* — Howard D Brown, Jr.
(74) *Attorney, Agent, or Firm* — Blank Rome LLP

(57) ABSTRACT

Embodiments of the present application provide a regional surveillance and alarming system and an alarming method. In the embodiment of the present application, each security region is provided with a control device having stored thereon an association table in which associated objects of a security region where the control device is located when this security region is taken as the first target object are recorded, and the associated objects may be a detection device or other target objects. When a change of the state of the detection device or the target object satisfies the alarm output triggering condition, the control device may issue an alarm. As such, a real-time surveillance and alarming of illegal events may be allowed.

15 Claims, 2 Drawing Sheets

(51) Int. Cl.
 *G08B 25/08* (2006.01)
 *G08B 25/14* (2006.01)

(52) U.S. Cl.
 CPC ......... *G08B 5/36* (2013.01); *G08B 13/19608* (2013.01); *G08B 13/19656* (2013.01); *G08B 13/19695* (2013.01); *G08B 13/19697* (2013.01); *G08B 25/00* (2013.01); *G08B 25/001* (2013.01); *G08B 25/08* (2013.01); *G08B 25/14* (2013.01)

(56) References Cited

U.S. PATENT DOCUMENTS

| | | | |
|---|---|---|---|
| 8,189,049 B2* | 5/2012 | Lopota | G06T 7/194 348/152 |
| 2003/0156030 A1* | 8/2003 | Lee | G08B 13/1961 340/541 |
| 2006/0114322 A1* | 6/2006 | Romanowich | G08B 13/19602 348/143 |
| 2009/0195382 A1* | 8/2009 | Hall | G08B 13/19613 340/541 |
| 2010/0052902 A1* | 3/2010 | Wu | G08B 13/19 340/541 |

FOREIGN PATENT DOCUMENTS

| | | |
|---|---|---|
| CN | 103021146 A | 4/2013 |
| CN | 103578240 A | 2/2014 |
| EP | 1 316 933 A2 | 6/2003 |
| JP | 2002170174 A | 6/2002 |
| WO | WO 2005/050582 A2 | 6/2005 |

\* cited by examiner

REGIONAL SURVEILLANCE AND ALARMING SYSTEM AND METHOD

This application is a U.S. national stage application based on International Application No. PCT/CN2016/103577, which claims priority to Chinese Patent Application No. 201610165835.1, filed Mar. 22, 2016, both of which are herein incorporated by reference in their entirety.

TECHNICAL FIELD

The application relates to the technical field of security, in particular to a regional surveillance and alarming system and method.

BACKGROUND

Security systems may be used to ensure the safety of important sites, for example, to prevent a place from being intruded, detect security accidents and allow an event trace. A security system mainly includes a video surveillance system, an alarm control system, and an access control system. These systems are independent from each other, but they may mutually communicate.

The video surveillance system is used for surveillance and video-taping, and the alarm system may output, in real time, an abnormality thereof and the observation of a front-end device. In a conventional security system, surveillance is typically solely based on videos or sensor data, and may thus have poor surveillance performance. In order to provide surveillance of better performance, technicians combine the video-based surveillance with the sensor-based surveillance, i.e., use a camera to capture images of a region under surveillance of sensors.

However, an existing video-based surveillance system only obtains a video of a region that is being under surveillance, and may thus fail to give a timely alarm of an event of illegality. Although such an event of illegality may be later known from a captured video, it may not be dealt with in time as the violator may have left the site.

SUMMARY

The purpose of the embodiment of the application is to provide a regional surveillance and alarming system and method, to solve the problem of failing to issue an alarm for an event of illegality in time.

For the purpose above, an embodiment of the present application provides a regional surveillance and alarming method, which is applicable to a control device in a surveillance system, the control device having stored thereon an association table, in which a plurality of target objects, an associated object of each of the target objects and an alarm output triggering condition for each of the target objects are recorded, wherein, the target objects include a security region where the control device is located or a video surveillance region, the alarm output triggering condition for each target object is a result of a logical operation on states of all the associated objects of the target object, the security region where the control device is located is taken as a first target object, and the security region includes at least one video surveillance region, the method including: determining all first associated objects of the first target object based on associated objects of a target object recorded in the association table as stored in the control device, wherein the first associated objects include at least one of a video surveillance region and a detection device; obtaining a state of each of the first associated objects, wherein, when a first associated object is a detection device, determining a state of the detection device based on a signal output by the detection device; and when a first associated object is a video surveillance region that is also taken as a second target object, determining all second associated objects of the second target object, and determining a state of the second target object based on the states of all the second associated objects and the alarm output triggering condition for the second target object as recorded in the association table, wherein the second associated object is a detection device and/or a video surveillance region; determining whether a result of a logical operation on the states of all the first associated objects satisfies the alarm output triggering condition for the first target object as recorded in the association table; and if the result satisfies the condition, outputting an alarm signal.

Optionally, determining a state of the second target object based on the states of all the second associated objects and the alarm output triggering condition for the second target object as recorded in the association table includes:

when a state of at least one second associated object changes, sending a start command to an image acquisition device located in the video surveillance region to enable the image acquisition device to acquire an image and/or video;

determining whether the image and/or video acquired by the image acquisition device satisfies the alarm output triggering condition for the second target object; and if the image and/or video satisfies the condition, determining that the second target object is in an alarm state, or otherwise, determining that the second target object is in a normal state.

Optionally, the start command contains parameter information for image acquisition.

Optionally, the detection device includes at least one of: a sensor, a detector, an electronic fence and an alarm switch.

Optionally, outputting an alarm signal includes:

sending an alarm signal to an alarm device to control the alarm device to issue an alarm.

Optionally, the alarm device includes an acousto-optic alarm, a loudspeaker, and an alarm bell.

An embodiment of the present application provides a regional surveillance and alarming system, including a control device for a security region, wherein the security region includes at least one video surveillance region, the control device is communicatively connected with a detection device and an image acquisition device in the at least one video surveillance region;

the detection device is configured for entering an alarm state when an alarm output condition is satisfied;

the image acquisition device is configured for image and/or video acquisition;

the control device is configured for determining all first associated objects of the first target object based on associated objects of a target object in the association table as stored in the control device, wherein the first associated objects include at least one of a video surveillance region and a detection device; obtaining a state of each first associated object, wherein, when a first associated object is a detection device, determining a state of the detection device based on a signal output by the detection device; and when a first associated object is a video surveillance region that is also taken as a second target object, determining all second associated objects of the second target object, and determining a state of the second target object based on the states of all the second associated objects and the alarm output triggering condition for the second target object as recorded in the association table; determining whether a result of a logical operation on the states of all the first associated objects satisfies the alarm output triggering condition for the first target object as recorded the association table; if so, outputting an alarm signal.

Optionally, the control device is further configured for: when a state of at least one second associated object changes, sending a start command to an image acquisition device located in the video surveillance region; determining whether the image and/or video acquired by the image acquisition device satisfies the alarm output triggering condition for the second target object; and if the image and/or video satisfies the condition, determining that the second target object is in an alarm state, or otherwise, determining that the second target object is in a normal state;

the image acquisition device is configured for receiving the start command to acquire an image and/or video, and sending the acquired image and/or video to the control device.

Optionally, the control device is further configured for sending a start command containing parameter information for image acquisition to the image acquisition device;

the image acquisition device is further configured for acquiring an image and/or video acquisition according to the parameter information.

Optionally, the control device is further configured for, when a state of at least one second associated object changes, sending a start command to an image acquisition device located in the video surveillance region and obtaining state information output by the image acquisition device;

the image acquisition device is configured for receiving the start command to acquire an image and/or video, determining whether the acquired image and/or video satisfies the alarm output triggering condition for the second target object; and if the image and/or video satisfies the condition, entering an alarm state, or otherwise, entering a normal state.

Optionally, the detection device includes at least one of: a sensor, a detector, an electronic fence and an alarm switch.

Optionally, the system further includes an alarm device configured for receiving an alarm signal from the control device to issue an alarm.

Optionally, the alarm device includes an acousto-optic alarm, a loudspeaker, and an alarm bell.

For the purpose above, an embodiment of the present application further provides a control device in a surveillance system, wherein the control device includes a processor, a memory, a communication interface and a bus;

the processor, the memory and the communication interfaces are communicatively connected with each other by the bus;

the memory stores executable codes therein;

the processor executes a program corresponding to the executable codes stored in the memory by reading the executable codes, so as to perform the regional surveillance and alarming method provided by the embodiments of the present application.

For the purpose above, an embodiment of the present application provides a storage medium having executable codes stored thereon which, when executed, performs the regional surveillance and alarming method provided by the embodiments of the present application.

For the purpose above, an embodiment of the present application provides an executable program code which, when executed, performs the regional surveillance and alarming method provided by the embodiments of the present application.

Embodiments of the present application provide a regional surveillance and an alarming system and method. In the method, an association table may be established in which a plurality of target objects, an associated object of each of the target objects and an alarm output triggering condition for each of the target objects are stored. The target objects include a security region where the control device is located or a video surveillance region. The alarm output triggering condition for each target object is a result of a logical operation on states of all the associated objects of the target object. The control device in a security region determines all first associated objects of the first target object based on associated objects of a target object recorded in the association table as stored in the control device, obtains a state of each of the first associated objects, determines whether a result of a logical operation on the states of all the first associated objects satisfies the alarm output triggering condition, and if so, outputs an alarm signal. In the embodiments of the present application, each security region is provided with a control device having stored thereon an association table in which associated objects of a security region where the control device is located, when the security region is taken a first target object, are recorded. The associated object may be a detection device or other target objects. When a change of the state of the detection device or the target object satisfies the alarm output triggering condition, the control device may issue an alarm. As such, a real-time surveillance and alarming of illegal events may be allowed. Therefore, multiple security regions may be monitored separately and a better surveillance is provided. Of course, any product or method implemented based on the present application will not necessarily have all the advantages mentioned above.

BRIEF DESCRIPTION OF DRAWINGS

To describe the solutions of embodiments of the present application and the prior art more clearly, the accompanying drawings to be used in the embodiments and the prior art are described briefly below. Obviously, the accompanying drawings described below are merely some embodiments of the application, based on which those skilled in the art may obtain other drawings without creative efforts.

DETAILED DESCRIPTION

In order to issue timely an alarm for an event of illegality, embodiments of the present application provide a regional surveillance and alarming system and method.

To make the objectives, technical solutions, and advantages of the present application more comprehensible, the present application is described in detail below in association with embodiments with reference to the accompanying drawings. Obviously, the described embodiments are merely a part of but not all the embodiments of the present application. All other embodiments obtained without creative efforts in view of the embodiments of the present application by those skilled in the art fall within the scope of the present application.

A security system generally provides surveillance in units of security regions. In embodiments of the present application, a security region is divided into one or more video surveillance regions, each of which is provided with an image acquisition device capable of monitoring this region. A control device within a security region is used for determining the state of the security region. Each security region may have a separate control device, or otherwise a plurality of security regions may share one control device.

The method for regional surveillance and alarming provided by an embodiment of the present application is applicable to any control device in a surveillance system. The control device is located in the security region that includes at least one video surveillance region. The control device having stored thereon an association table, in which a plurality of target objects, an associated object of each of the target objects and an alarm output trigger condition for each of the target objects are recorded. The target object contains a security region where the control device is located or a video surveillance region. The alarm output trigger condition for each target object is obtained based on a result of a logical operation on states of all the associated objects of the target object. For ease of description, the security region in which a control device is located is referred to as a first target object.

Figure 1:
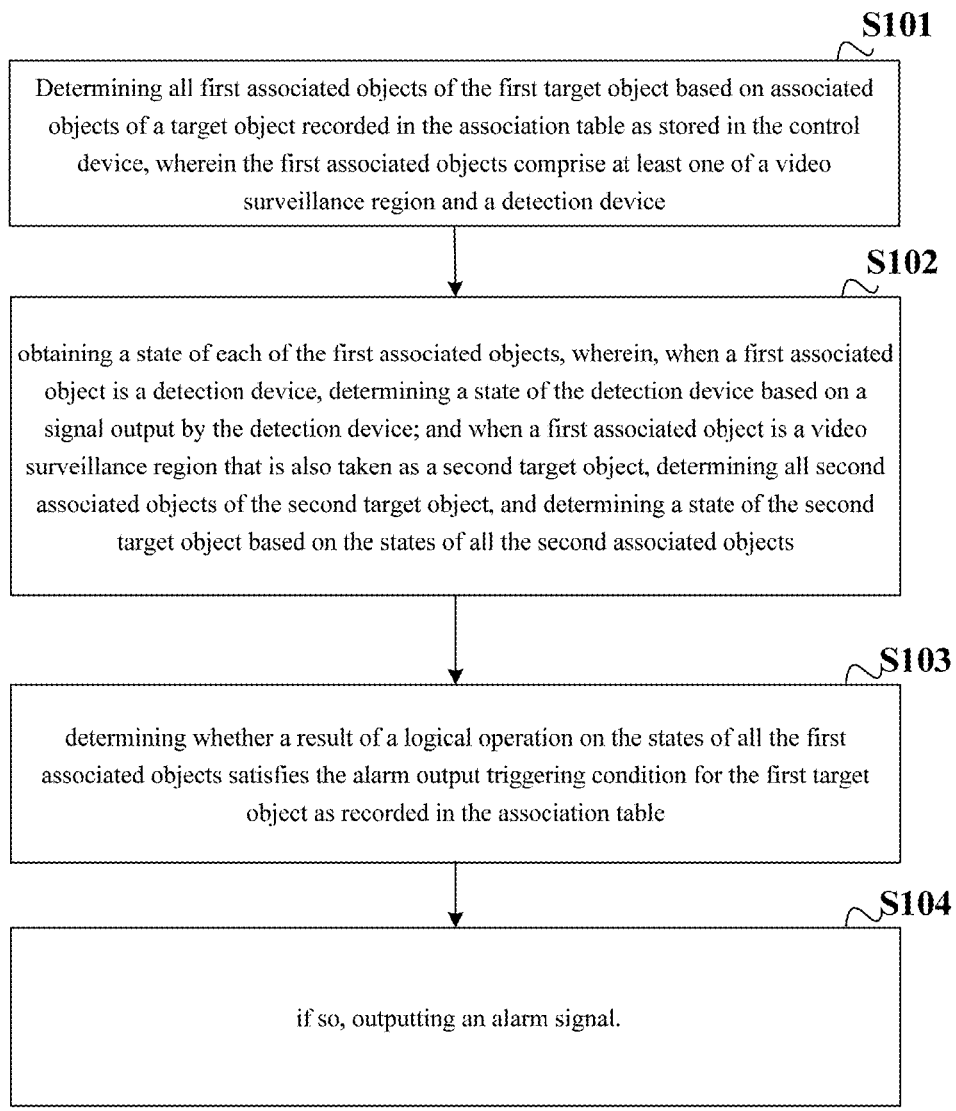
FIG. 1 is a regional surveillance and alarming process provided by an embodiment of the present application.

FIG. 1 is a regional surveillance and alarming process provided by an embodiment of the present application. The process includes the following steps.

S101, determining all first associated objects of the first target object based on associated objects of a target object recorded in the association table as stored in the control device, wherein the first associated objects include at least one of a video surveillance region and a detection device;

In the embodiment of the present application, each security region is provided with a control device having an association table stored thereon. The association table records target objects and associated objects of each of the target objects. A target object may be a security region, a video surveillance region or a detection device. An associated object may be a detection device or a video surveillance region. The associated objects may also include simultaneously both of the detection device and the video surveillance region.

Specifically, in the embodiment of the present application, the security region may include one or more video surveillance regions.

S102, obtaining a state of each of the first associated objects, wherein, when a first associated object is a detection device, determining a state of the detection device based on a signal output by the detection device; and when a first associated object is a video surveillance region that is also taken as a second target object, determining all second associated objects of the second target object, and determining a state of the second target object based on the states of all the second associated objects and the alarm output triggering condition for the second target object as recorded in the association table, wherein the second associated object is a detection device and/or a video surveillance region.

The control device determines whether to output an alarm signal based on the states of all the associated objects of the security region in which the control device is located.

An associated object may either be a detection device or an image acquisition device in a video surveillance region. When the associated object is a detection device, the state of the detection device may be determined based on a signal the detection device is able to output. When the associated object is a video surveillance region, the state of the video surveillance region is determined based on a device related thereto. In the determination of the state of the video surveillance region, the video surveillance region is determined as a second target object, and then the state of the video surveillance region may be determined based on the associated objects of the second target object as recorded in the association table.

S103, determining whether a result of a logical operation on the states of all the first associated objects satisfies the alarm output triggering condition for the first target object as recorded in the association table.

Specifically, the association table stores an alarm output condition for each target object. The association table may also store, for each alarm output condition, a result of a logical operation of the states of all associated objects of the target object. The logical operation may include "SUM", "OR", "AND", or any combination thereof.

S104, if the result satisfies the condition, outputting an alarm signal.

In the embodiments of the present application, each security region is provided with a control device having stored thereon an association table in which associated objects of a security region where the control device is located, when the security region is taken a first target object, are recorded. The associated object may be a detection device or other target objects. When a change of the state of the detection device or the target object satisfies the alarm output triggering condition, the control device may issue an alarm. As such, a real-time surveillance and alarming of illegal events may be allowed. Therefore, multiple security regions may be monitored separately and a better surveillance is provided.

In the present embodiment, when an associated object is a video surveillance region, the state of the video surveillance region is determined according to states of all associated objects of the video surveillance region (referred as second associated objects). If there is a detection device in the second associated object, the state of the detection device may be determined based on a signal output therefrom. If the second associated object is another video surveillance region, the state thereof is determined according to the states of third associated objects of the video surveillance region. In another embodiment of the present application, the determination of the state of the second target object based on the states of all second associated objects and an alarm output triggering condition for the second target object as recorded in the association table includes:

when a state of at least one second associated object changes, sending a start command to an image acquisition device located in the video surveillance region to enable the image acquisition device to acquire an image and/or video;

determining whether the image and/or video acquired by the image acquisition device satisfies the alarm output triggering condition for the second target object; and if the image and/or video satisfies the condition, determining that the second target object is in an alarm state, or otherwise, determining that the second target object is in a normal state.

In the above embodiment of the application, the detection device includes at least one of: a sensor, a detector, an electronic fence and an alarm switch.

In order to output an alarm, the device in each associated object of the security region is connected with the control device for the security region.

Figure 2:
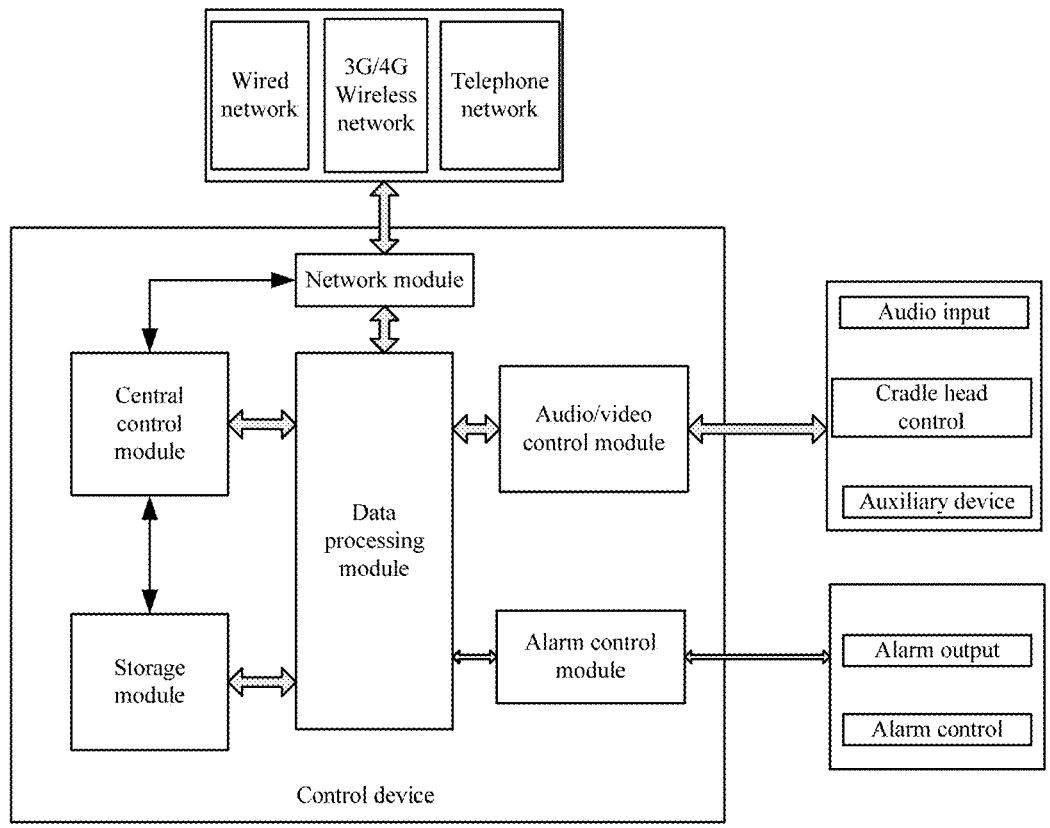
FIG. 2 is a schematic structural diagram of a control device in an embodiment of the present application.

FIG. 2 is a schematic structural diagram of a control device provided by the embodiment of the application.

Specifically, the control device may be communicatively connected to a detection device through a network module, so as to receive an alarm signal output by the detection device. The control device may be provided with an audio/video control module to identify whether the detection device issues an alarm by detecting an alarm signal output by the detection device.

The control device may obtain the state of a device in an associated object of the security region where it is located. The control device also stores an association table thereon. The control device may, when identifying a change in the state of the associated object, determine the target object of the associated object, and send a start command to the image acquisition device for the target object to enable the image acquisition device to acquire an image and/or video.

The details are as shown in FIG. 1:

TABLE 1

| target object | associated objects | alarm output condition |
|---|---|---|
| security region 1 | video surveillance region 1, detection device 1 | a result of a logical AND operation on states of associated objects |
| video surveillance region 1 | detection device 1 | occlusion in video |
| detection device 1 | None | None |

A control device is located in the security region 1, and communicatively connected to an image acquisition device in the video surveillance region 1 and a detection device 1. The association table stored in the control device is shown in Table 1.

In order to determine whether to output an alarm signal, the control device firstly determines associated objects of the security region 1 where it is located. As shown in Table 1, the associated objects include the video surveillance region 1 and the detection device 1, and the alarm output triggering condition is determined based on a logical AND operation on the states of the associated objects. The image acquisition device in the video surveillance region 1 works when there is a change in the state of the detection device 1. For example, the detection device outputs an alarm signal when occlusion occurs in video.

The detection device 1 enters an alarm state after outputting an alarm signal. The control device sends a start command to the image acquisition device located in the video surveillance region 1 identified as a target object of the detection device, so as to notify the image acquisition device to acquire an image and/or video and obtains the acquired image and/or video from the image acquisition device. When there is an occlusion in the video, the video surveillance region 1 enters an alarm state. The video surveillance region 1 also enters an alarm state when the control device in the security region 1 identifies that the detection device 1 outputs an alarm signal. A logical AND operation on the states of the associated objects produces a result of alarm state. The control device thereby outputs an alarm signal.

Specifically, the control device may control a cradle head of an image acquisition device to control the angles from which images and/or videos are acquired, so that images and/or videos for different regions may be acquired. Images acquired by the image acquisition device may be sent to the control device. The control device may determine whether there is a change in the state of the corresponding video surveillance region. The image acquisition device may be an ordinary analog camera or an IP digital camera.

The audio/video control module of the control device may also be connected to auxiliary devices such as an illuminating lamp or an infrared light. When the control device identifies there is no light outside, the illuminating lamp or infrared light may be open to ensure that the image acquisition device acquires relatively clear images and/or videos. The control device also includes an alarm controlling module, which is connected with some alarm devices, such as an acousto-optic alarm, a loudspeaker, an alarm bell and the like, so as to output an alarm.

In order to connect the control device with other devices, a communication module is included in the control device. The communication module may connect to other devices through a 3G/4G network, a broadband network, a telephone network or the like. In order to facilitate subsequent information search, the control device also includes a storage module for storing images and/or videos captured by the image acquisition device, as well as alarm information. The control device also includes a data processing module for data processing (such as encoding, decoding, and stream analysis of video data) and recognition operations (such as motion detection, face recognition, voice recognition, and occlusion recognition). The central processing module of the control device is used to manage the whole video alarm system. In particular, the central processing module maintains the relationships between security regions, video surveillance regions and detection devices and obtains the state of each video surveillance region and the state of the security region.

In the embodiments of the present application, in order to ensure the definition of images and/or videos acquired by the image acquisition device, the control device may control, in addition to the cradle head of the image acquisition device, the image magnification of the image acquisition device. Specifically, the start command sent to the image acquisition device by the control device contains parameter information (e.g., magnification information) for image acquisition. Depending on hardware properties of the image acquisition device, the parameter information sent to each image acquisition device may be different. The parameter information may be stored in the control device in advance. When an image acquisition device is to be started, the parameter information stored for the image acquisition device is sent to this image acquisition device.

Specifically, for example, a security region is divided into three video surveillance regions. The parameter information for the image acquisition device in each of the video surveillance regions may be stored in the control device as shown in Table 2:

TABLE 2

| video surveillance region | parameter information | | cradle head parameter | |
|---|---|---|---|---|
| | magnification n | resolution r | α | β |
| video surveillance region 1 | n1 | r1 | α1 | β1 |
| video surveillance region 2 | n2 | r2 | α2 | β2 |
| video surveillance region 3 | n3 | r3 | α3 | β3 |

Parameter information for each video surveillance region locally stored by a control device is recorded in above Table 2. Specifically, the parameter information may include one or more video parameters of the video acquisition device for the video surveillance region, for example, a magnification n and a resolution r. In addition, cradle head parameters for each video surveillance region may also be recorded in the Table 2. The magnification is used to adjust the magnification of an image, wherein an object at a more distant place may be magnified more. The resolution is used to adjust the definition of an image so as to have a clear image. The cradle head parameters are used to control the cradle head in two dimensions. The security region may be placed at the center of the acquired image through adjustment of the cradle head parameters.

The control device may send the parameter information in Table 2 to an image acquisition device when the image acquisition device is known to be in operation. The cradle head of the image acquisition device may then be controlled based on the cradle head parameters in Table 2 so that the monitoring of the video surveillance region by the image acquisition device may be optimized.

To describe the embodiments of this application in detail, reference may be made to the following specific examples.

TABLE 3-continued

| target object | associated object | alarm output triggering condition |
|---|---|---|
| video surveillance region 1 | detection device 2 | a detected motion or occlusion in video |
| detection device 2 | None | None |

Detection device 2 is an infrared motion detection device. The detection device 2 issues an alarm, i.e., enters an alarm state, in case where a moving object is detected. At this time, the detection device 2 controls the image acquisition device in the video surveillance region 1 to acquire a video, and detects motion and occlusion in the acquired video. If there is a moving object or occlusion, the video surveillance region 1 is determined to be in an alarm state. The control device may determine the state of the security region 2 in the same way as in the first embodiment, the detail which is thus omitted here.

The Third Embodiment

TABLE 4

| target object | associated object | alarm output triggering condition |
|---|---|---|
| security region 3 | video surveillance region 2, video surveillance region 3, detection device 3 | result of a logical AND operation on the obtained result of a logical OR operation on the states of video regions, and the state of the detection device 3 |
| video surveillance region 2 | detection device 3 | a detected motion or occlusion in video |
| video surveillance region 3 | detection device 3 | a detected motion or occlusion in video |
| detection device 3 | None | None |

The First Embodiment

Referring to Table 1, the detection device 1 is an alarm switch. The button of the switch may be pressed by a security personnel in an event of illegality, and as a result, the switch enters an alarm state. Upon an identification that the alarm switch is issuing an alarm, the control device may control the image acquisition device in the video surveillance region 1 to acquire a video and send the acquired video to the control device. The control device may identify whether there is occlusion in the received video, and determines, if so, that the video surveillance region 1 is in an alarm state. The control device may determine, based on the result of an AND operation of the states of the associated objects, whether to generate an alarm for the security region 1 where the control device is located. In this case, as the detection device 1 and the video surveillance region 1 are both in an alarm state, the security region 1 is also in an alarm state. Thus, the control device outputs an alarm signal.

The Second Embodiment

TABLE 3

| target object | associated object | alarm output triggering condition |
|---|---|---|
| security region 2 | video surveillance region 1, detection device 2 | a result of a logical AND operation on associated objects |

Detection device 3 is an electronic fence that issues an alarm when touched. The detection device 3 then enters an alarm state. At this time, the image acquisition devices in the video surveillance region 2 and the video surveillance region 3 are controlled to acquire videos. Motion and occlusion are detected in the videos acquired by the two image acquisition device. If a moving object or occlusion is detected, the corresponding video surveillance region is determined to be an alarm state. The alarm output triggering condition for the security region 3 is a result of a logical AND operation on the obtained result of a logical OR operation on the states of video regions, and the state of the detection device 3. If any video surveillance region is determined to be in an alarm state, the security region 3 would thus be determined to be in an alarm state since the detection device 3 is currently in an alarm state, then the control device outputs an alarm signal for alarm.

The content in Tables 1, 3 and 4 may be incorporated into one association table and stored in the control device so as to monitor the whole security region. The addition of a new device into the security system, addition of a new security region or a video surveillance region, and removal of device susceptible of failure from the video surveillance region may be simply implemented by a modification of the association table.

Figure 3:
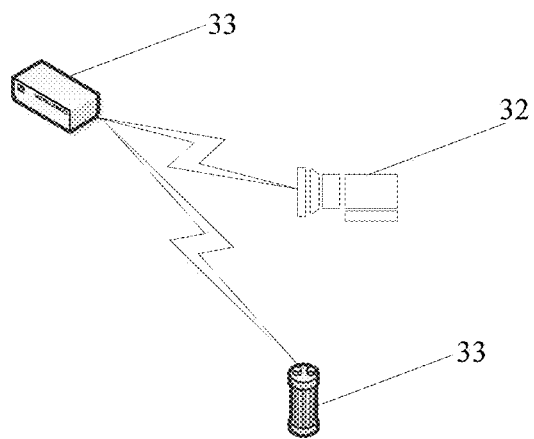
FIG. 3 is a schematic structural diagram of a regional surveillance and alarming system provided by an embodiment of the present application.

FIG. 3 is a schematic structural diagram of a regional surveillance and alarming system provided by an embodiment of the present application. The system includes a control device 31 for a security region including at least one video surveillance region. The control device is communicatively connected with a detection device 33 and an image acquisition device 32 in the at least one video surveillance region.

The detection device 33 is configured for entering an alarm state when an alarm output condition is satisfied.

The image acquisition device 32 is configured for acquiring an image and/or video.

The control device 31 is configured for determining all first associated objects of the first target object based on associated objects of a target object in the association table as stored in the control device, wherein the first associated objects include at least one of a video surveillance region and a detection device; obtaining a state of each first associated object, wherein, when a first associated object is a detection device, determining a state of the detection device based on a signal output by the detection device; and when a first associated object is a video surveillance region that is also taken as a second target object, determining all second associated objects of the second target object, and determining a state of the second target object based on the states of all the second associated objects and the alarm output triggering condition for the second target object as recorded in the association table; determining whether a result of a logical operation on the states of all the first associated objects satisfies the alarm output triggering condition for the first target object as recorded the association table; if so, outputting an alarm signal.

The control device 31 is specifically configured for, when a state of at least one second associated object changes, sending a start command to an image acquisition device located in the video surveillance region; determining whether the image and/or video acquired by the image acquisition device satisfies the alarm output triggering condition for the second target object; and if the image and/or video satisfies the condition, determining that the second target object is in an alarm state, or otherwise, determining that the second target object is in a normal state. The image acquisition device 32 is thus configured for receiving the start command to acquire an image and/or video, and sending the acquired image and/or video to the control device.

The control device 31 is specifically configured for sending a start command containing parameter information for image acquisition to the image acquisition device. The image acquisition device 32 is further configured for acquiring an image and/or video acquisition according to the parameter information.

The control device 31 is specifically configured for, when a state of at least one second associated object changes, sending a start command to an image acquisition device located in the video surveillance region and obtaining state information output by the image acquisition device. The image acquisition device 32 is configured for receiving the start command to acquire an image and/or video, determining whether the acquired image and/or video satisfies the alarm output triggering condition for the second target object; and if the image and/or video satisfies the condition, entering an alarm state, or otherwise, entering a normal state.

The detection device 33 includes at least one of: a sensor, a detector, an electronic fence and an alarm switch.

The system may further include an alarm device (not shown in Figures).

The alarm device is configured for receiving an alarm signal from the control device for alarm.

The alarm device includes an acousto-optic alarm, a loudspeaker, and an alarm bell.

Embodiments of the present application provide a regional surveillance and an alarming system and method. In the method, an association table may be established in which a plurality of target objects, an associated object of each of the target objects and an alarm output triggering condition for each of the target objects are stored. The target objects include a security region where the control device is located or a video surveillance region. The alarm output triggering condition for each target object is a result of a logical operation on states of all the associated objects of the target object. The control device in a security region determines all first associated objects of the first target object based on associated objects of a target object recorded in the association table as stored in the control device, obtains a state of each of the first associated objects, determines whether a result of a logical operation on the states of all the first associated objects satisfies the alarm output triggering condition, and if so, outputs an alarm signal. In the embodiments of the present application, each security region is provided with a control device having stored thereon an association table in which associated objects of a security region where the control device is located, when the security region is taken a first target object, are recorded. The associated object may be a detection device or other target objects. When a change of the state of the detection device or the target object satisfies the alarm output triggering condition, the control device may issue an alarm. As such, a real-time surveillance and alarming of illegal events may be allowed.

Further, an embodiment of the present application further provides a control device in a surveillance system. The control device may include a processor, a memory, a communication interface and a bus.

The processor, the memory and the communication interface are communicatively connected with each other by the bus.

The memory stores executable codes therein.

The processor executes a program corresponding to the executable codes stored in the memory by reading the executable codes, so as to execute the regional surveillance and alarming method provided by the embodiment of the present application. The control device having stored thereon an association table, in which a plurality of target objects, an associated object of each of the target objects and an alarm output triggering condition for each of the target objects are recorded. The target objects include a security region where the control device is located or a video surveillance region. The alarm output triggering condition for each target object is a result of a logical operation on states of all the associated objects of the target object. The security region where the control device is located is taken as a first target object. The security region includes at least one video surveillance region. The method provided by embodiments of the present application includes:

determining all first associated objects of the first target object based on associated objects of a target object recorded in the association table as stored in the control device, wherein the first associated objects include at least one of a video surveillance region and a detection device;

obtaining a state of each of the first associated objects, wherein, when a first associated object is a detection device, determining a state of the detection device based on a signal output by the detection device; and when a first associated object is a video surveillance region that is also taken as a second target object, determining all second associated objects of the second target object, and determining a state of the second target object based on the states of all the second associated objects and the alarm output triggering condition for the second target object as recorded in the association table, wherein the second associated object is a detection device and/or a video surveillance region;

determining whether a result of a logical operation on the states of all the first associated objects satisfies the alarm output triggering condition for the first target object as recorded in the association table; and if the result satisfies the condition, outputting an alarm signal.

Wherein, determining a state of the second target object based on the states of all the second associated objects and the alarm output triggering condition for the second target object as recorded in the association table includes:

when a state of at least one second associated object changes, sending a start command to an image acquisition device located in the video surveillance region to enable the image acquisition device to acquire an image and/or video;

determining whether the image and/or video acquired by the image acquisition device satisfies the alarm output triggering condition for the second target object; and if the image and/or video satisfies the condition, determining that the second target object is in an alarm state, or otherwise, determining that the second target object is in a normal state.

Wherein, the start command contains parameter information for image acquisition.

Wherein, the detection device includes at least one of: a sensor, a detector, an electronic fence and an alarm switch.

Wherein, outputting an alarm signal includes: sending an alarm signal to an alarm device to control the alarm device to issue an alarm.

Wherein, the alarm device includes an acousto-optic alarm, a loudspeaker, and an alarm bell.

In addition, an embodiment of the present application also provides a storage medium having executable codes stored thereon which, when executed, performs the regional surveillance and alarming method provided by the embodiment of the present application. The method is applicable to a control device in a surveillance system. The control device having stored thereon an association table, in which a plurality of target objects, an associated object of each of the target objects and an alarm output triggering condition for each of the target objects are recorded. The target objects include a security region where the control device is located or a video surveillance region. The alarm output triggering condition for each target object is a result of a logical operation on states of all the associated objects of the target object. The security region where the control device is located is taken as a first target object. The security region includes at least one video surveillance region. The method provided by embodiments of the present application includes:

determining all first associated objects of the first target object based on associated objects of a target object recorded in the association table as stored in the control device, wherein the first associated objects include at least one of a video surveillance region and a detection device;

obtaining a state of each of the first associated objects, wherein, when a first associated object is a detection device, determining a state of the detection device based on a signal output by the detection device; and when a first associated object is a video surveillance region that is also taken as a second target object, determining all second associated objects of the second target object, and determining a state of the second target object based on the states of all the second associated objects and the alarm output triggering condition for the second target object as recorded in the association table, wherein the second associated object is a detection device and/or a video surveillance region;

determining whether a result of a logical operation on the states of all the first associated objects satisfies the alarm output triggering condition for the first target object as recorded in the association table; and if the result satisfies the condition, outputting an alarm signal.

Wherein, determining a state of the second target object based on the states of all the second associated objects and the alarm output triggering condition for the second target object as recorded in the association table includes:

when a state of at least one second associated object changes, sending a start command to an image acquisition device located in the video surveillance region to enable the image acquisition device to acquire an image and/or video;

determining whether the image and/or video acquired by the image acquisition device satisfies the alarm output triggering condition for the second target object; and if the image and/or video satisfies the condition, determining that the second target object is in an alarm state, or otherwise, determining that the second target object is in a normal state.

Wherein, the start command contains parameter information for image acquisition.

Wherein, the detection device includes at least one of: a sensor, a detector, an electronic fence and an alarm switch.

Wherein, outputting an alarm signal includes: sending an alarm signal to an alarm device to control the alarm device to issue an alarm.

Wherein, the alarm device includes an acousto-optic alarm, a loudspeaker, and an alarm bell.

In addition, an embodiment of the present application also provides an executable code that is configured for executing the regional surveillance and alarming method provided by the embodiment of the present application. The method is applicable to a control device in a surveillance system. The control device having stored thereon an association table, in which a plurality of target objects, an associated object of each of the target objects and an alarm output triggering condition for each of the target objects are recorded. The target objects include a security region where the control device is located or a video surveillance region. The alarm output triggering condition for each target object is a result of a logical operation on states of all the associated objects of the target object. The security region where the control device is located is taken as a first target object. The security region includes at least one video surveillance region. The method provided by embodiments of the present application includes:

determining all first associated objects of the first target object based on associated objects of a target object recorded in the association table as stored in the control device, wherein the first associated objects include at least one of a video surveillance region and a detection device;

obtaining a state of each of the first associated objects, wherein, when a first associated object is a detection device, determining a state of the detection device based on a signal output by the detection device; and when a first associated object is a video surveillance region that is also taken as a second target object, determining all second associated objects of the second target object, and determining a state of the second target object based on the states of all the second associated objects and the alarm output triggering condition for the second target object as recorded in the association table, wherein the second associated object is a detection device and/or a video surveillance region;

determining whether a result of a logical operation on the states of all the first associated objects satisfies the alarm output triggering condition for the first target object as recorded in the association table; and if the result satisfies the condition, outputting an alarm signal.

Wherein, determining a state of the second target object based on the states of all the second associated objects and the alarm output triggering condition for the second target object as recorded in the association table includes:

when a state of at least one second associated object changes, sending a start command to an image acquisition device located in the video surveillance region to enable the image acquisition device to acquire an image and/or video;

determining whether the image and/or video acquired by the image acquisition device satisfies the alarm output triggering condition for the second target object; and if the image and/or video satisfies the condition, determining that the second target object is in an alarm state, or otherwise, determining that the second target object is in a normal state.

Wherein, the start command contains parameter information for image acquisition.

Wherein, the detection device includes at least one of: a sensor, a detector, an electronic fence and an alarm switch.

Wherein, outputting an alarm signal includes: sending an alarm signal to an alarm device to control the alarm device to issue an alarm.

Wherein, the alarm device includes an acousto-optic alarm, a loudspeaker, and an alarm bell.

It is noted that in the claims and the specification, relationship terms such as "first", "second" and the like are only used to distinguish one entity or operation from another entity or operation, and do not necessarily require or imply that there is any such actual relationship or order between those entities or operations. Moreover, the terms "include" "include" or any other variants are intended to cover a non-exclusive inclusion, such that processes, methods, objects or devices including a series of elements include not only those elements, but also other elements not specified or the elements inherent to those processes, methods, objects or devices. Without further limitations, elements limited by the phrase "include(s) a . . . " do not exclude that there are other identical elements in the processes, methods, objects or devices that include that element.

All of the embodiments in the description are described in a correlated manner, and identical or similar parts in various embodiments can refer to one another. In addition, the description for each embodiment focuses on the differences from other embodiments. In particular, the embodiment of the apparatus is described briefly, since it is substantially similar to the embodiment of the method, and the related contents can refer to the description of the embodiment of the method.

What has been described above are merely preferred embodiments of the present application, and are not used to limit the scope of protection of the present application. Any modification, equivalent replacement or improvement made within the spirit and principle of the present application falls within the scope of protection of the present application.

What is claimed is:

1. A regional surveillance and alarming method, which is applicable to a control device in a surveillance system, the control device having stored thereon an association table, in which a plurality of target objects, an associated object of each of the target objects and an alarm output triggering condition for each of the target objects are recorded, wherein, the target objects comprise a security region where the control device is located or a video surveillance region, the alarm output triggering condition for each target object is a result of a logical operation on states of all the associated objects of the target object, the security region where the control device is located is taken as a first target object, and the security region comprises at least one video surveillance region, the method comprising:

determining all first associated objects of the first target object based on associated objects of a target object recorded in the association table as stored in the control device, wherein the first associated objects comprise at least one of a video surveillance region and a detection device;

obtaining a state of each of the first associated objects, wherein, when a first associated object is a detection device, determining a state of the detection device based on a signal output by the detection device; and when a first associated object is a video surveillance region that is also taken as a second target object, determining all second associated objects of the second target object, and determining a state of the second target object based on the states of all the second associated objects and the alarm output triggering condition for the second target object as recorded in the association table, wherein the second associated object is a detection device and/or a video surveillance region;

determining whether a result of a logical operation on the states of all the first associated objects satisfies the alarm output triggering condition for the first target object as recorded in the association table; and if the result satisfies the condition, outputting an alarm signal.

2. The method of claim 1, wherein, determining a state of the second target object based on the states of all the second associated objects and the alarm output triggering condition for the second target object as recorded in the association table comprises:

when a state of at least one second associated object changes, sending a start command to an image acquisition device located in the video surveillance region to enable the image acquisition device to acquire an image and/or video;

determining whether the image and/or video acquired by the image acquisition device satisfies the alarm output triggering condition for the second target object; and if the image and/or video satisfies the condition, determining that the second target object is in an alarm state, or otherwise, determining that the second target object is in a normal state.

3. The method of claim 2, wherein, the start command contains parameter information for image acquisition.

4. The method of claim 1, wherein, the detection device comprises at least one of: a sensor, a detector, an electronic fence and an alarm switch.

5. The method of claim 1, wherein, outputting an alarm signal comprises:

sending an alarm signal to an alarm device to control the alarm device to issue an alarm.

6. The method of claim 5, wherein, the alarm device comprises an acousto-optic alarm, a loudspeaker, and an alarm bell.

7. A regional surveillance and alarming system, comprising a control device for a security region, wherein the security region comprises at least one video surveillance region, the control device is communicatively connected with a detection device and an image acquisition device in the at least one video surveillance region;

the detection device is configured for entering an alarm state when an alarm output condition is satisfied;

the image acquisition device is configured for acquiring an image and/or video;

the control device is configured for determining all first associated objects of the first target object based on associated objects of a target object in the association table as stored in the control device, wherein the first associated objects comprise at least one of a video surveillance region and a detection device; obtaining a state of each first associated object, wherein, when a first associated object is a detection device, determining a state of the detection device based on a signal output by the detection device; and when a first associated object is a video surveillance region that is also taken as a second target object, determining all second associated objects of the second target object, and determining a state of the second target object based on the states of all the second associated objects and the alarm output triggering condition for the second target object as recorded in the association table; determining whether a result of a logical operation on the states of all the first associated objects satisfies the alarm output triggering condition for the first target object as recorded the association table; if so, outputting an alarm signal.

8. The system of claim 7, wherein, the control device is further configured for, when a state of at least one second associated object changes, sending a start command to an image acquisition device located in the video surveillance region; determining whether the image and/or video acquired by the image acquisition device satisfies the alarm output triggering condition for the second target object; and if the image and/or video satisfies the condition, determining that the second target object is in an alarm state, or otherwise, determining that the second target object is in a normal state;

the image acquisition device is configured for receiving the start command to acquire an image and/or video, and sending the acquired image and/or video to the control device.

9. The system of claim 8, wherein, the control device is further configured for sending a start command containing parameter information for image acquisition to the image acquisition device;

the image acquisition device is further configured for acquiring an image and/or video acquisition according to the parameter information.

10. The system of claim 7, wherein, the control device is further configured for, when a state of at least one second associated object changes, sending a start command to an image acquisition device located in the video surveillance region and obtaining state information output by the image acquisition device;

the image acquisition device is configured for receiving the start command to acquire an image and/or video, determining whether the acquired image and/or video satisfies the alarm output triggering condition for the second target object; and if the image and/or video satisfies the condition, entering an alarm state, or otherwise, entering a normal state.

11. The system of claim 7, wherein, the detection device comprises at least one of: a sensor, a detector, an electronic fence and an alarm switch.

12. The system of claim 7, wherein, further comprising an alarm device configured for receiving an alarm signal from the control device to issue an alarm.

13. The system of claim 12, wherein, the alarm device comprises an acousto-optic alarm, a loudspeaker, and an alarm bell.

14. A control device in a surveillance system, wherein the control device comprises a processor, a memory, a communication interface and a bus;

the processor, the memory and the communication interface are communicatively connected with each other by the bus;

the memory stores executable codes therein;

the processor executes a program corresponding to the executable codes stored in the memory by reading the executable codes, so as to perform the regional surveillance and alarming method of claim 1.

15. A storage medium having executable codes stored thereon which, when executed, performs the regional surveillance and alarming method of claim 1.

* * * * *